July 20, 1937.　　　　K. M. HAMILTON　　　　2,087,476
CAR TRUCK
Filed March 25, 1931　　　　3 Sheets-Sheet 1

INVENTOR
Karl M. Hamilton
BY Evans + McCoy
ATTORNEYS

July 20, 1937. K. M. HAMILTON 2,087,476
CAR TRUCK
Filed March 25, 1931 3 Sheets-Sheet 2

INVENTOR
Karl M. Hamilton
BY
Evans + McCoy
ATTORNEYS

Patented July 20, 1937

2,087,476

UNITED STATES PATENT OFFICE 2,087,476

CAR TRUCK

Karl M. Hamilton, Chicago, Ill., assignor to The Bettendorf Company, Bettendorf, Iowa, a corporation of Iowa Application March 25, 1931, Serial No. 525,051

4 Claims. (Cl. 105—197.1)

This invention relates to car trucks, and more particularly to car trucks of the swing motion type.

It has been found that in the case of the transportation of eggs and perishable goods, a large portion of the shipping loss in damaged goods results from the transportation of these goods in railway cars in which the car bodies are subjected to continuous vertical oscillations and transverse shocks. In the case of eggs it has been found that vertical rhythmic oscillations and transverse shocks cause a breaking down of the air cells of the eggs, with the result that the eggs spoil during transportation. In the case of fruit and other perishables, the oscillations and other motions produce a packing action on such fruits as peaches, oranges, apples and the like which is very injurious in that the bruises that result from such packing action oftentimes produce bad spots.

It is one of the objects of the present invention to overcome many of the objectionable features which occur in conventional car trucks, and to provide a car truck in which there is substantially no rapid rhythmic vertical oscillation during operation.

Another object is to provide a car truck in which the bolster supporting springs have a variable resistance and a variant recovery.

Another object is to provide a swing motion car truck having a combination of coil and elliptic springs whereby to provide easy riding action and to avoid transverse shocks and rapid vertical oscillations.

A further object is to provide a swing motion truck wherein the bolster supporting springs during operation will recover in different periods of time in order to avoid rapid rhythmic vertical oscillations and to provide an easy riding construction.

With the above and other objects in view which will be apparent from the following detailed description, the present invention consists in certain features of construction and combinations of parts that will be readily apparent to those skilled in the art to which the invention appertains.

In the drawings which illustrate a suitable embodiment of the present invention, Figure 1 is a side elevation of the improved car truck of the present invention;

Figure 1:
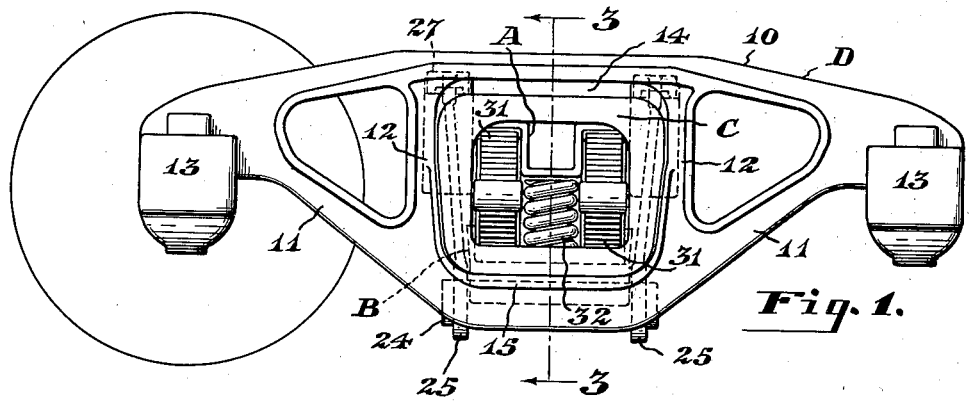

Referring to the accompanying drawings in which like numerals refer to like parts throughout the several views, it will be noted that both sides of the car truck are not shown in complete detail, it being sufficient for the present invention to describe only one side of the car truck, since both sides are of identical construction.

In general, the transversely extending bolster A is supported by means of suitable springs on the spring plank B which in turn is supported from the transom C for movement transversely thereof by means of spaced hanger links hinged to the ends of the transom C, the transom C bridging and being carried by the opposite side frames D of the car truck.

The car truck side frames are each preferably of the cast type, having an integral upper compression cord 10, a lower tension cord 11, and spaced bolster columns 12 extending vertically between the cords 10 and 11. The cords 10 and 11 extend beyond the columns 12 and integrally join each other and terminate in the journal boxes 13.

The cords 10 and 11 and vertical columns 12 are illustrated as being of box or U section throughout in order to give the greatest strength for a given weight of material. A large central opening 14 is formed in each side frame D, it being defined by the central portion of the compression cord 10, the central horizontal arch bar 15 of the tension cord 11, and the spaced vertical columns 12.

Figure 2:
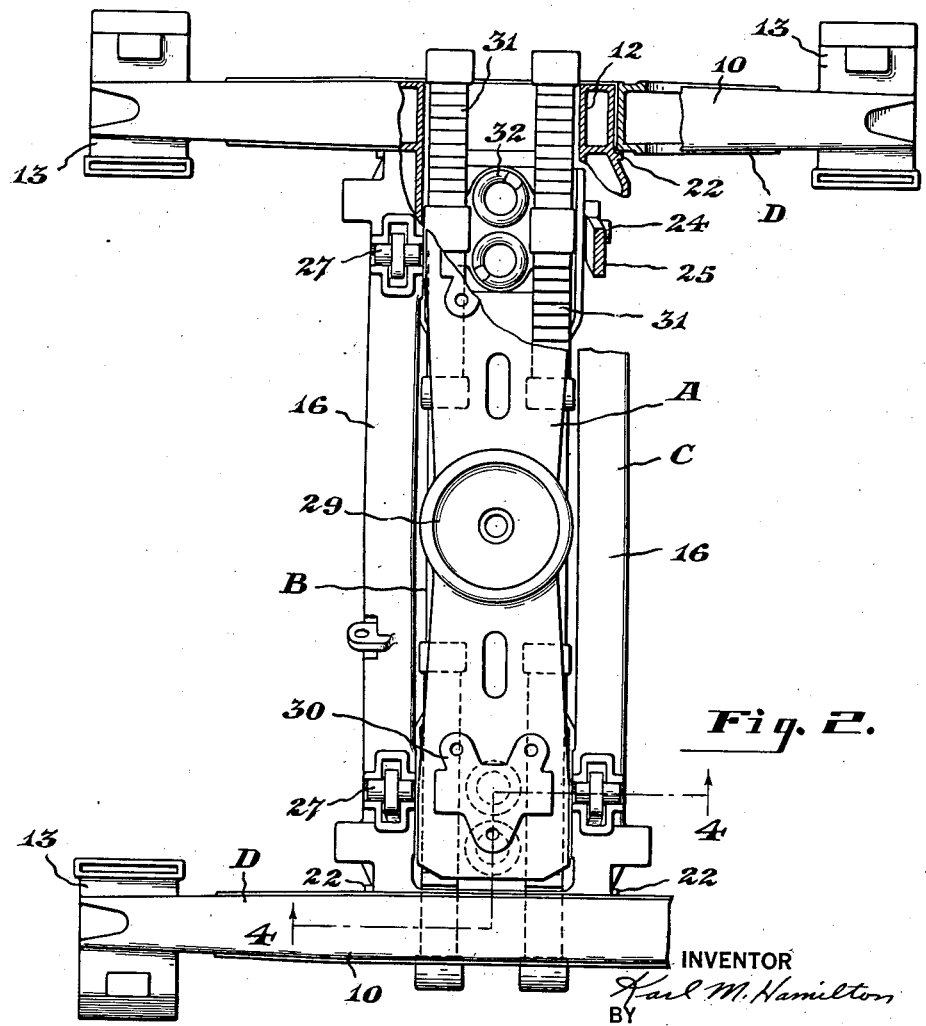
Fig. 2 is a partial plan view of the car truck shown in Fig. 1, a portion of the truck bolster and transom being broken away to show the arrangement of the coil and elliptic springs.
Figure 3:
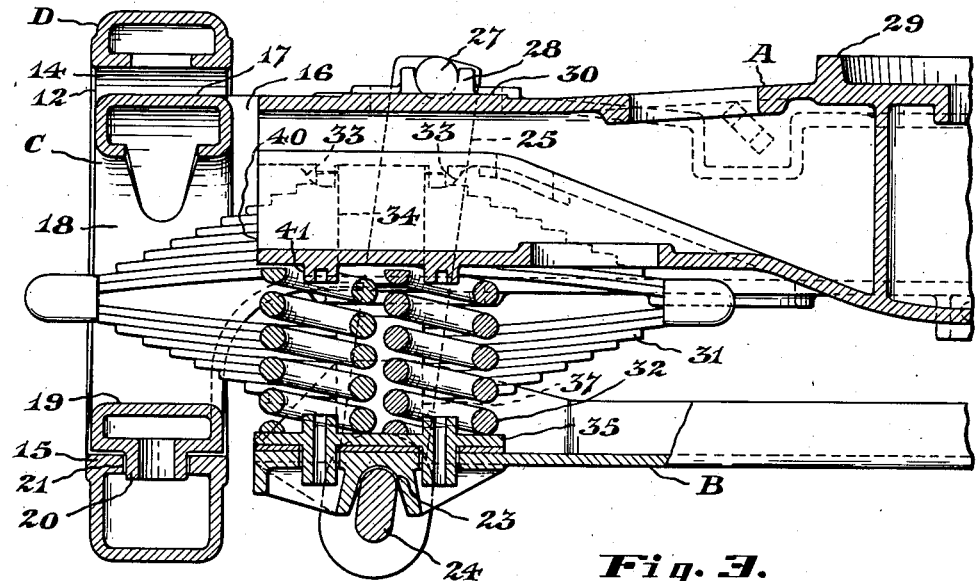
Fig. 3 is an enlarged section taken substantially on the line 3—3 of Fig. 1, showing the method of supporting the truck bolster on the transom which is carried by the truck side frames.
Figure 5:
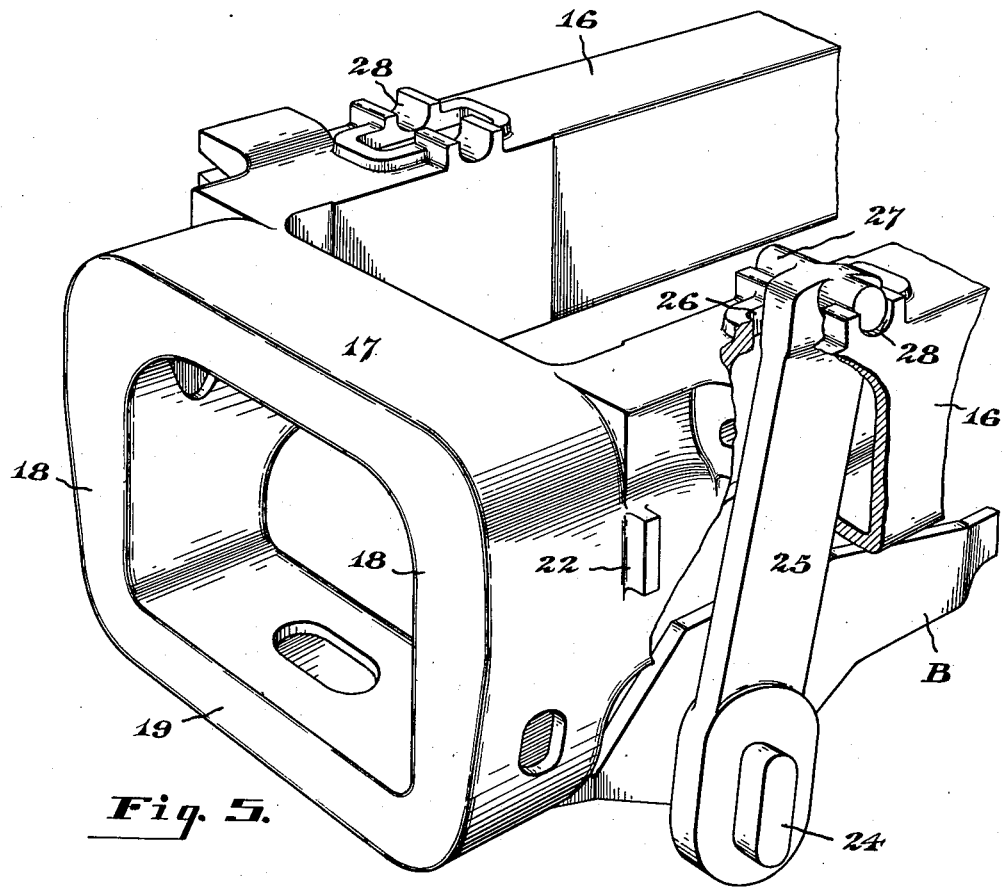
Fig. 5 is a fragmentary enlarged perspective view of the transom showing one of the hanger links which support the spring plank in position.
Figure 6:
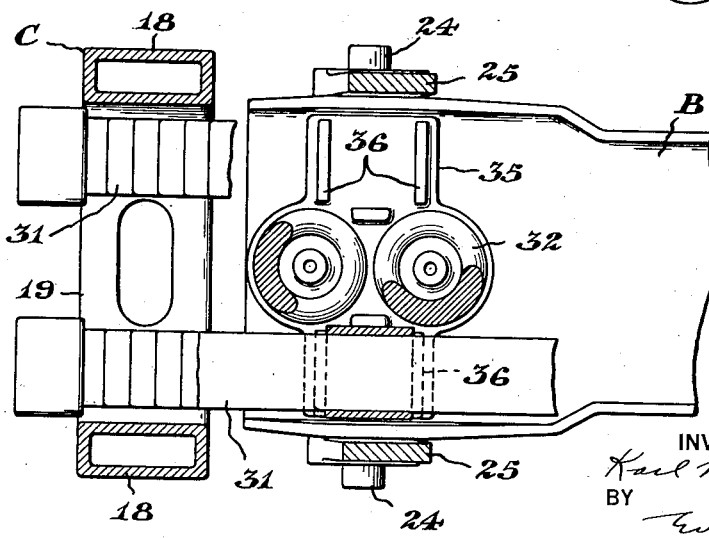
Fig. 6 is a section taken substantially on the line 6—6 of Fig. 4.

The transom C extends between the side frames D, as shown in Figs. 2 and 3, and comprises a pair of spaced horizontal beams 16 arranged parallel to each other. Each beam 16 is preferably hollow and rectangular in cross-section and the beams are connected together at their adjacent ends, as shown in Fig. 5, by rectangular shaped members each having an upper cross piece 17, the walls of which merge into the walls of the beams 16, spaced vertical side portions 18 forming substantial integral continuations of the beams 16, and a lower cross piece 19 extending between the vertical portions 18, below the beams 16. There upper and lower cross pieces and the vertical side portions, like the beams 16, are preferably hollow and of rectangular shape in cross-section.

The transom C is a single casting and, as viewed from top or bottom, or either of its ends, has the appearance of a hollow rectangle.

Figure 4:
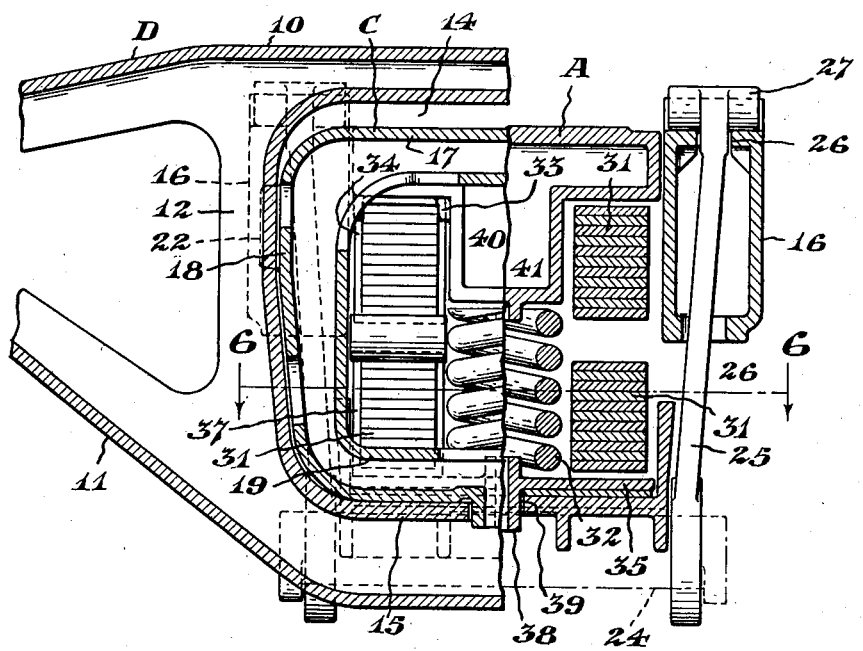
Fig. 4 is an enlarged section taken substantially on the line 4—4 of Fig. 2.

The generally rectangular shaped ends of the transom C formed of the side portions 18 and cross bars 17 and 19 are of slightly less width than, and of materially less depth than the central openings 14 of the side frames, and when the car truck is assembled these generally rectangular shaped ends rest within the central openings 14 of the side frames D with the lower webs of the transom cross pieces or bars 19 seating on the upper horizontal webs of the lower horizontal arch bars 15 of the side frame tension cords 11, as shown in Figs. 3 and 4.

The transom is anchored on the side frames preferably by means of bosses 20 formed on and depending from the lower webs of the transom cross pieces 19 which register with openings 21 formed in the horizontal portions 15 of the side frame tension cords 11, and by means of projecting lugs 22 formed on the outer vertical webs of the beams 16 of the transom which preferably engage with the inner sides of the side frame columns 12.

The spring plank B may be of any desirable construction and is shown in the drawings as being of inverted channel shape. The ends of the spring plank are formed on their lower sides with spaced inverted U-shaped bearing portions 23, as shown in Fig. 3, which support the spring plank by their pivotal engagement with rectangular shaped pivot bars 24 having rounded edges, one edge of each pivot bar being in engagement with the adjacent bearing portion 23.

Each pivot bar 24 is supported at its ends from depending hanger links 25 which extend downwardly through elongated openings 26 formed in the upper and lower webs of the horizontal beams 16. The upper ends of these hanger links are formed with oppositely extending horizontal pivot shafts 27 which pivotally seat in semicircular seats 28 formed on the top side of the beams 16 of the transom. In normal position the links 25 at each end of the transom extend downwardly and outwardly at an angle. It is thus seen that the spring plank B is freely suspended below the transom C for movement transversely of the side frames D by means of the pivot bars 25 at the opposite ends of the transom which converge upwardly. This thus provides side motion which greatly increases the ease of riding and eliminates substantial transverse shocks.

The bolster A is of the cast type, but it is obvious that it may be of any desired design. The bolster is provided with the usual center plate 29 and bearing plates 30 for the usual side bearings. The bolster A is supported at its ends on the spring plank B by means of suitable elliptic springs 31 and coil springs 32. Each end of the bolster is supported by two spaced full elliptic springs 31 which extend outwardly through the opening in the generally rectangular open end portion of the transom, and two coil springs 32 interposed between the elliptic springs. These sets of springs are mounted on a suitable spring seat 35 carried at the ends of the spring plank, and in order to maintain the elliptic springs 31 properly aligned with the bolster, the bolster is preferably formed at each end with spaced lugs 33 which straddle the upper spring band 34.

In a similar manner the spring seat 35 is formed with spaced lugs 36, corresponding with the lugs 33, which straddle the lower spring band 37 to align the springs 31 with the spring seat 35. These lugs 33 and 36 maintain the springs 31 in alignment and prevent sidewise tilting in a horizontal plane and longitudinal shifting of the spring with reference to the spring seat.

The spring seat 35 is held against movement on the spring plank B by means of spaced bosses 38 which extend through corresponding openings 39 in the spring plank. The opposite upper side of the spring seat is also formed with upwardly extending bosses which extend within the coil springs 32.

The bolster is formed at each end intermediate its sides with a depending portion 40 which extends between the elliptic springs 31 and forms a seat for the coil springs 32. This depending portion is also formed with small centering bosses 41 which extend within the springs 32, as shown in Fig. 3.

In conventional car truck construction, coil springs are employed and these springs must be of such capacity that they will support a car which is loaded to capacity. There are conditions, however, when the car is used to transport goods that are bulky but light in weight, and not of sufficient weight to give a full weight capacity load. Hence, in such an instance the freight car will ride very hard and impart severe shocks to the articles being transported, which in the case of long haul fast freight service produce very disastrous results on such articles as eggs and perishable fruits and vegetables.

The purpose of the present invention, as previously explained, is to provide a spring suspension of such type that these disadvantages will be practically eliminated.

In the present invention, the coil and full elliptic springs 32 and 31, respectively, are so arranged that for full capacity loads both sets of springs will function and therefore provide a variable recovery, thus eliminating sudden shocks. The two sets of springs, being of different capacity, function together in such a manner as to break up rhythmic vertical oscillations.

These springs are also so arranged that under light loads less than full capacity, only the elliptic springs will function to provide easy riding, but upon excessive deflection of the elliptic springs, the coil springs come into play and exert a damping effect which prevents the elliptic springs from setting up objectionable rhythmic vibrations.

This spring arrangement in cooperation with the transverse swing motion suspension provides a car truck very suitable for refrigerator cars and cabooses which materially reduces vertical shocks and oscillations and transverse shocks with the result that shipping losses due to damaged goods are materially reduced.

The advantages of an easy riding, substantially shockless car truck are readily apparent, and it can be seen that in such a construction bruises due to continuous impacting shocks will be eliminated in the case of perishable fruit, and also in the case of eggs the breaking down of air cells due to sudden shocks will be substantially eliminated.

The present invention, in addition to the particular spring arrangement, also has to do with the construction and particular assemblage of the other parts making up the car truck.

It will be noted that the parts are so constructed as to give the most strength without excessive weight and also arranged so as to permit assembly without the use of bolts, rivets, and the like, the transom being detachably interlocked with the side frames.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In a car truck, the combination with the side frames thereof, having central openings, of a cast transom having its ends received in said central openings, a spring plank suspended for transverse swinging movement relative to said transom, a bolster, a pair of spaced elliptic springs interposed between said spring plank and bolster at their opposite ends to resiliently support said bolster, and a plurality of coil springs at each end of said spring plank positioned between said spaced elliptic springs and interposed between said spring plank and bolster.

2. In a car truck, the combination with the side frames thereof, having central openings, of a cast transom having its ends received in said central openings, a spring plank suspended for transverse swinging movement relative to said transom, a bolster, a pair of spaced elliptic springs interposed between said spring plank and bolster at their opposite ends to resiliently support said bolster, and a plurality of coil springs at each end of said spring plank positioned between said spaced elliptic springs and interposed between said spring plank and bolster, said elliptic and coil springs being of different buoyancy and arranged to cooperate with each other and thereby lessen and break up rhythmic oscillations.

3. In a car truck, the combination with the side frames thereof, having central openings, of a cast transom having its ends received in said central openings, a spring plank suspended for transverse swinging movement relative to said transom, a bolster, a pair of spaced elliptic springs interposed between said spring plank and bolster at their opposite ends to resiliently support said bolster, and a plurality of coil springs at each end of said spring plank positioned between said spaced elliptic springs and interposed between said spring plank and bolster, said coil and elliptic springs being of different capacity, the springs of one type being arranged to support light loads and the combination of the springs of both types being arranged to support heavy loads and to function together in materially reducing and breaking up rhythmic oscillations.

4. In a car truck having side frames and a transom extending therebetween, the combination therewith of a spring plank suspended from said transom for swinging movement longitudinally thereof, a bolster having a depending portion at each end thereof intermediate its sides, and means at each end of said spring plank for resiliently supporting said bolster, said means comprising a pair of elliptic springs arranged at the sides of said depending portion and interposed between said spring plank and bolster, and a plurality of coil springs of different capacity than said elliptic springs interposed between said elliptic springs and extending between said spring plank and depending portion of said bolster.

KARL M. HAMILTON.